United States Patent
Williams

[11] 4,045,600
[45] Aug. 30, 1977

[54] METHOD OF INHIBITING PLASTICIZER MIGRATION FROM PLASTICIZED POLY(VINYL CHLORIDE) SUBSTRATES

[75] Inventor: Gary E. Williams, Lancaster, Pa.

[73] Assignee: Armstrong Cork Company, Lancaster, Pa.

[21] Appl. No.: 743,049

[22] Filed: Nov. 18, 1976

[51] Int. Cl.² .................. B32B 27/30; D06N 3/04; B44D 1/14
[52] U.S. Cl. .................. 427/379; 427/385 B; 427/407 F; 428/424; 428/425; 428/500; 428/904; 260/77.5 AT
[58] Field of Search .................. 427/379, 385 B, 407 F; 428/424, 425, 904; 260/77.5 AT

[56] References Cited
U.S. PATENT DOCUMENTS

| | | | |
|---|---|---|---|
| 3,669,717 | 6/1972 | Alcamatsu et al. | 427/379 |
| 3,892,895 | 7/1975 | Togoo et al. | 427/385 B |

Primary Examiner—Michael R. Lusignan
Attorney, Agent, or Firm—Richard J. Hammond

[57] ABSTRACT

Migration of plasticizer from plasticized PVC substrate is inhibited by coating the surface of the substrate by the steps of (1) applying to the surface of the plasticized polyvinyl chloride a solution consisting essentially of an inert organic solvent and an isocyanate-terminated polyurethane, said coating having a viscosity of from about 50 to 200 centipoise; (2) removing the organic solvent from the applied solution wherein a first substantially homogeneous film of thermosettable polyurethane is formed of from about 1.0 to 2.0 mils in thickness; (3) applying to the substantially homogeneous film surface of Step 2 said coating composition of Step 1; (4) removing said organic solvent from the applied solution of Step 3 wherein a second substantially homogeneous film of a thermosettable polyurethane is formed of from 2.0 to 3.0 mils in thickness; (5) repeating Steps 1 and 2 wherein said coating solution is applied to the surface of the substantially homogeneous film of Step 4 to form a third substantially homogeneous film of a thermosettable polyurethane of from about 1.5 to 3.0 mils in thickness; thereby inhibiting plasticizer migration from the polyvinyl chloride substrate to the third substantially homogeneous film.

5 Claims, 2 Drawing Figures

METHOD OF INHIBITING PLASTICIZER MIGRATION FROM PLASTICIZED POLY(VINYL CHLORIDE) SUBSTRATES

BACKGROUND OF THE INVENTION

1. Field of the Invention

This invention relates to a surface treatment for plasticized polyvinyl chloride substrates, and particularly to a method for coating such substrates so as to prevent plasticizer migration from the substrate to the topmost layer coating the substrate.

2. Description of the Prior Art

The surface of plasticized polyvinyl chloride often becomes tacky as a result of plasticizer migration from the interior of the vinyl composition. In an effect to prevent or inhibit such migration, it has been the preferred technique to coat such substrates with various polymeric materials. Among the most popular polymeric coatings for plasticized PVC substrates are the acrylic ester polymers, polyvinyl acetate, modified polyamides or polyurethanes. U.S. Pat. No. 3,669,717 discloses that plasticized polyvinyl chloride surfaces can be prevented from becoming tacky by coating such with a poly-gamma-alkyl glutamate held to the polyvinyl chloride surface by a primer coating of homopolymer or copolymer of PVC having a low degree of polymerization (500 or less). However, the coatings of this invention cannot be used on flooring materials because of the poor traffic abrasion properties. While the remainder of the above polymers are somewhat effective for the purpose for which they are intended, they also are not entirely satisfactory from the standpoint of inadequate resistance to wear and solvents. Of particular concern is the fact that the most satisfactory of the wear-resistant polymers, the polyurethanes, when used over plasticized polyvinyl chloride substrates do not actually prevent plasticizer migration, but in fact, become themselves plasticized, leading to a diminution of wear resistance and undersirable traffic staining.

It has now been found that multiple coatings over plasticized polyvinyl chloride substrates can significantly retard the diffusion of plasticizer to the surface of the coated article.

Summary of the Invention

It is an object of this invention to substantially inhibit plasticizer migration from plasticized polyvinyl chloride substrates.

It is a further object of this invention to provide a combination of thermosetting, essentially polyurethane coatings on a plasticized polyvinyl chloride substrate that will provide high resistance to traffic staining and give good wear appearance properties.

This and other objects of the present invention are accomplished by coating the surface of a plasticized polyvinyl chloride substrate by the steps of (1) applying to said surface a coating of a solution consisting essentially of an inert organic solvent and an isocyanate-terminated polyurethane, said coating having a viscosity of from 50 to 200 centipoise; (2) removing said solvent from the applied solution wherein a first substantially homogeneous film of a thermosettable polyurethane is formed of from 1.0 to 2.0 mils in thickness; (3) applying to the substantially homogeneous film surface of Step 2 said coating solution of Step 1; (4) removing said solvent from the applied solution of Step 3 wherein a second substantially homogeneous film of a thermosettable polyurethane is formed of from 2.0 to 3.0 mils in thickness; (5) repeating Steps 1 and 2 wherein said coating solution is applied to the surface of the substantially homogeneous film of Step 4 to form a third substantially homogeneous film of a thermosettable polyurethane of from 1.5 to 3.0 mils in thickness; thereby inhibiting plasticizer migration from the polyvinyl chloride substrate to the third substantially homogeneous film.

For a more complete understanding of the present invention, reference is made to the following detailed description and figures.

DESCRIPTION OF THE PREFERRED EMBODIMENTS

Figure 1:
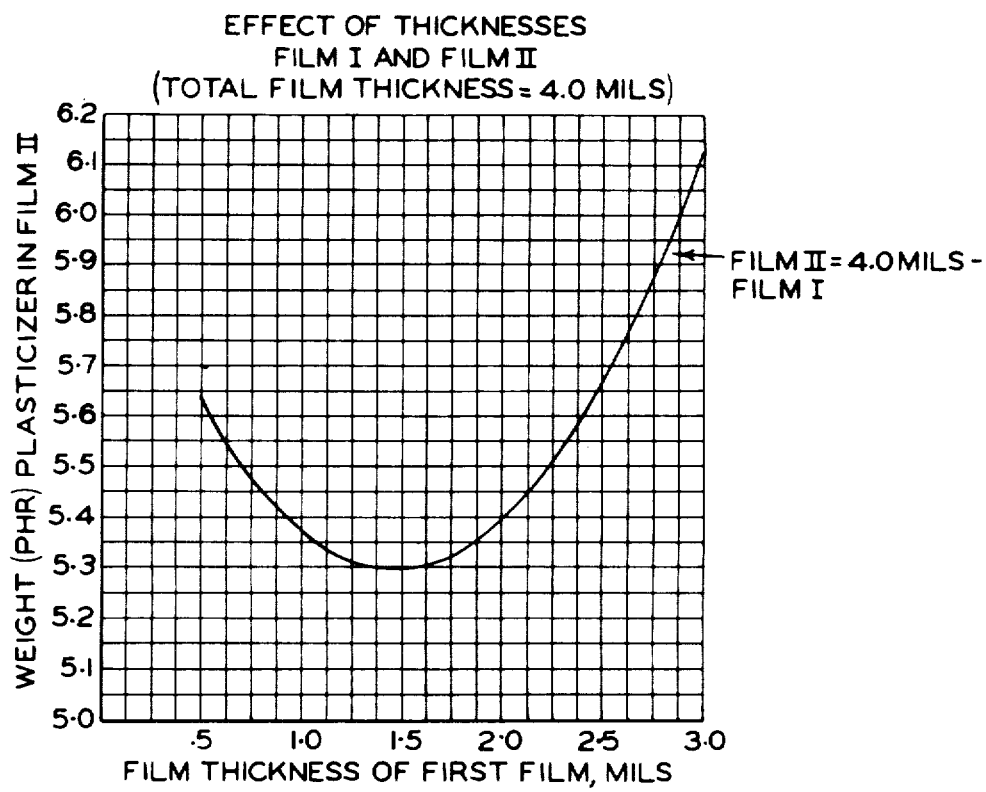
FIG. 1 demonstrates the relationship of the first and second film thicknesses to the weight of plasticizer migration into the composite film and FIG. 2 shows the rate of plasticizer migration through the polyurethane coatings from the plasticized polyvinyl chloride substrate.

The isocyanate-terminated polyurethane polymer also referred to herein as a "prepolymer," employed in part as the dissolved solids in the orgainc solvent coating solution, may be any such compound which may have been obtained by the reaction of selected polyols having average molecular weights of from 200 to 2,000 with a stoichiometric excess of an organic polyisocyanate. Such prepolymers are capable of chain extension and cross linking (commonly called curing) with water or other chain-extending agents.

While any organic compounds containing at least two active hydrogen atoms may be reacted with the stoichiometric excess of organic polyisocyanate to give rise to the isocyanate-terminated prepolymer, which is then capable of molecular weight increase by the above-mentioned curing reaction, the urethane-forming polyols are preferred for the method of this invention. The isocyanate-terminated urethane prepolymers are often in an essentially liquid state, either in their prepolymeric form or when dissolved in an organic solvent. They usually demonstrate good storage stability in that they will not cure to an intractable solid unless further contacted with water or other reagents containing active hydrogen compounds. These prepolymers can have a free isocyanate content of from about 4% to 13%, preferably at least about 5%, and most preferably about 5.5% to 7.5% weight percent based on the prepolymer content.

Any of a wide variety of organic polyisocyanates can be employed to form the prepolymer useful in this invention. Diisocyanates are preferred, but minor amounts of other polyisocyanates can be employed, providing the compositions are not unduly diliteriously affected. These diisocyanates may be aliphatic, aromatic or mixed aliphatic-aromatic structures. The aliphatic and cycloaliphatic diisocyanates are preferred, especially when making urethane coated substrate that exhibits good resistance to yellowing effects of ultraviolet irradiation. The isocyanates can be substituted with non-interfering groups such as aliphatic hydrocarbon radicals, e.g., lower alkyl or other groups having no active hydrogen as determined by the Zerewitinoff test, J. Am. Chem. Soc., 49, 3181 (1927). The diisocyanates often have as little as 6 carbon atoms and usually do not have more that about 40 carbon atoms in their molecule. Diisocyanates of about 8 to 20 carbon atoms in the hydrocarbon group are preferred. Suitable diisocyanates include di-(isocyanato cyclohexyl) methane, 1-isocyanato-3-isocyanatomethyl-3,5,5-trimethyl cyclohexane, hexamethylene diisocyanate, methylcyclohexyl diisocyanate, 2,4,4-trimethylhexamethylene diisocyanate, 2,6-tolylene diisocyanate, 2,4-tolylene diisocyanate, p-phenylene diisocyanate, p,p'-diphenylmethane diisocyanate, 1,5-naphthalene diisocyanate, and the like. The use of aromatic diisocyanates usually lowers the resistance of the urethane coatings to the effects of ultraviolet light.

As noted, the urethane-forming polyols are preferred in forming the prepolymers useful as coatings in this invention. The polyols can be aliphatic, cycloaliphatic, aromatic, or mixed structures of these types. The polyols preferred contain a major amount of aliphatic polyols having a molcular weight of at least about 300. These polyols are diols, including ether diols, triols including ether triols or mixtures thereof. Other polyols having greater than three hydroxy groups may also be used in conjunction with the diols and/or triols. The polyols have at least two hydroxy groups, preferably attached to aliphatic carbon atoms. The structure of the polyol is usually hydrocarbon in nature, but other substituents may be incorporated in the hydrocarbon moiety so as to effect changes in the properties of the resulting prepolymer. Molecular weights of these polyols may average up to about 2,000 or more, but those of 300 to 1,000 average molecular weight are preferred.

Among the wide variety of polyols which can be used in this invention are those represented by the formula:

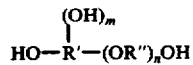

in which R' is a hydrocarbon radical, preferably aliphatic and saturated, and R" is an alkylene radical of 2 to 4, preferably 2 to 3, carbon atoms. R' preferably has 2 to 12, or more preferably 2 to 6, carbon atoms. The letter $n$ represents a number of from 0 to about 50, depending on the molecular weight desired, while the letter $m$ is 0 to 2 or more. When $n$ is other than 0, R' may often be the same as R".

Suitable aliphatic alcohols include the polyether glycols of up to about 2,000 or more in molecular weight such as polyoxyethylene glycols, polyoxpropylene glycols, and polyoxbutylene glycols. The latter materials include the straight chain polyoxbutylene glycols often referred to as polytetramethylene ether glycols, as well as the branched chain polyoxbutylene glycols, for instance, made from 1,2- and 2,3-butylene oxides. Ethylene glycol, propylene glycol, butane diols, 1,6-hexamethylene glycol, and the like may also be used.

Suitable triols useful in forming the prepolymers herein, e.g., where $m = 1$, are those of low molecular weight such as trimethylol propane, trimethylol ethane, glycerol, 1,2,6-hexanetriol and the like. The aliphatic triols are preferred and include the polyoxyalkylene adducts of glycerine up to about 2,000 or more in molecular weight, such as the polyoxypropylene adduct and the polyoxbutylene adduct.

Others among the polyols useful in this invention include the hydroxy esters such as castor oil, polyol-modified castor oils, other polyol-modified fatty oils and hydroxy-terminated polyesters. Hydroxy-terminated polyester materials are generally made by the reaction of one or more polyhydroxy materials, such as the aliphatic polyols mentioned above, with one or more aliphatic, including cycloaliphatic, or aromatic polycarboxylic acids or esters, and such polyesters can often have hydroxyl values in the range of from about 25 to 150. Frequently in these polyesters, the polyhydroxy alcohols are predominantly diols and the acids are dicarboxylic acids, including their anhydrides, and preferably contain from about 4 to 50 carbon atoms, e.g., phthalic acid, adipic acid, sebacic acid, and the like. Modified castor oil partial esters can be made by ester interchange of the oil with polyols such as low molecular weight polyols, including glycols, glycerine, pentaerythritol, and so forth.

It is most preferred in the method in accordance with this invention to employ polyethylene oxide diols of molecular weight 400–700 admixed with polypropylene oxide diol of molecular weight 400–700.

As noted above, the prepolymeric material useful in the coating compositions of this invention include those in which at least a portion of the polyol reactant has at least three hydoxyl groups per molecule, such as those mentioned before. However, the amount or degree of functionality of the polyol should not be so great that an intractable or non-reactive prepolymer is obtained. Such cross-linking aliphatic polyols often have from about 3 to about 12, preferably about 3 to 6, carbon atoms, although their polyethers preferably have molecular weights of at least about 400. When the polyol component used in making the prepolymer contains cross-linking polyol, essentially the entire polyol may have at least about three hydroxyl groups per molecule, but large amounts of such polyol or polyols of high functionality may preclude the formation of organic solvent soluble prepolymers. It may, therefore, be desirable to limit the hydroxyl groups supplied by the cross-linking polyol of up to about 30, and preferably up to about 10, mole percent based on the total hydroxy groups.

The prepolymeric isocyanate-terminated polyurethane reaction products can be made by the simultaneous reaction of excess organic polyisocyanate and polyol, or by reacting part or all of one polyol prior to the reaction of the remaining amount of the material with the polyisocyanate. It is preferred to add the polyisocyanate to an essentially inert organic solvent solution of polyol from which all moisture has been removed. This is most easily accomplished by azeotropically distilling at atmospheric pressure the organic solvent/polyol solution until the distillate contains substantially no water. Although various other drying procedures can be used, such as the addition of drying agents and the like, the azeotropic distillation is preferred. The reaction temperatures for synthesis of the various prepolymer urethanes useful in the coating compositions of the present invention are often up to about 150° C., with about 50° C. being preferred. The reaction is preferably continued until there is essentially little, if any, unreacted hydroxy functonality remaining. A period of from about one to three hours is preferred for the reaction of the polyol in the organic polyisocyanate when a catalyst is not employed. However, when employing a catalyst, a reaction period of about ten minutes to about three hours is preferred.

Catalysts can be used in forming the prepolymers to accelerate the rate of reaction. Typically, the catalysts can be organotin compounds, for example dibutyl tin dilaurate and stannous octoate. Other useful catalysts include tertiary aliphatic and alicyclic amines, such as triethyl amine, triethanol amine, tri-n-butylamine, triethylene diamine, alkyl morpholines and the like. Mixtures of the aforementioned catalysts may also be employed.

While the reaction of the polyisocyanate and polyol may be effected in the absence of a solvent, the presence of such solvent is preferred in order to keep the reaction medium at low viscosity. When solvents are employed, convenient solvents are those inert organic solvents having a boiling range above about 100° C. at atmospheric pressure. Lower boiling solvents may, of course, be used when the reaction is carried out under pressure in a closed vessel. Solvents boiling at substantially more than 140° C. are difficult to remove from the film formed by coating the vinyl substrate with the compositions of the present invention. The solvent, when used, may be added at the beginning, the intermediate, or the end of the prepolymer reaction stage, or even after cooling of the formed prepolymer. The solvents to be used are preferably those in which the reactants have some solubility, but in which the final chain-extended and cross-linked polyurethane based polymer (the cured thermoset film) is insoluble. Ketones, tertiary alcohols, and esters may be used. The aliphatic hydrocarbon solvents such as the heptanes, octanes and the nonanes or mixtures of such hydrocarbons obtained from naturally occurring petroleum sources such as gasoline, or from synthetically prepared hydrocarbons may sometimes be employed. Cycloaliphatic hydrocarbons such as methylcyclohexane and aromatic hydrocarbons such as toluene may likewise be used. Toluene and xylene are the preferred solvents. The amount of the solvent used may vary widely. Any amount of up to about 100 parts of solvent per 100 parts of prepolymer has been found to be suitable in conducting a reaction. The excess solvent, where large amounts are employed, may be separated partially or completely from the prepolymer prior to forming the coating composition. However, this may be economically detrimental and large excesses of such solvent should be avoided.

It is essential in the coating composition of this invention to provide an organic solvent solution of the isocyanate-terminated urethane prepolymer having a viscosity of from about 50 to about 300 centipoise. Preferred viscosities for the coating composition are from 75 to 125 centipoise. By a viscosity of 50 to 300 centipoise is meant a viscosity as obtained on a Brookfield viscosimeter with use of a spindle No. 6 at 25° C. The organic solvent may be any of those solvents referred to before in which the preparation of the prepolymer was accomplished or it may be any mixture of such solvents. The function of the solvent in the coating formulation is to cause the prepolymer to attain a viscosity that is suitable for coating application as indicated above. However, the solvent must also be easily removed during the chain-extension/cross-linking phase, e.g., the curing phase of the process. Xylene is the particularly preferred solvent since it has a boiling point in the critical range of the polyisocyanate/polyol reactivity, provides a satisfactory solvent for both reactants and prepolymer without use of excessive volumes, and is easily removable during the curing stage of the process, e.g., the coating as applied to the vinyl substrate is easily dried.

The organic solution of prepolymer having the above viscosity is first applied to the substrate so as to give a substantially solvent-free coating film of from about 1.0 to 2.0 mils in thickness. The solvent may be removed from the coating composition after application to the substrate by a variety of methods, but air drying under forced air conditions at a temperature of from 120° C. to 175° C. gives a satisfactory film substantially free of solvent and at least partially chain extended and cross linked by reaction of water present in the heated air. It should be noted that this chain extension and cross linking (the curing reaction) of the isocyanate prepolymer with water is regarded as leading to the formation of the urea, biuret, and allophanate linkages. No particular amount of water is necessary at this point in the overall coating operation. However, it is generally preferred to effect the drying of this first coat and all subsequent coats applied onto or upon the first coat with some volumes of steam included in the forced air. In this manner, more water is available to react with the terminal isocyanate groups, effectively increasing the rate of cure. Times of exposure of this first coat to the above-mentioned temperature under forced air conditions vary between 2 to 10 minutes, but 4 to 5 minutes are preferred for economic operation. The coating procedure is repeated a second and third time resulting in a three-layer film of a polymeric coating that has been at least partially cross linked and chain extended by the reaction of the terminal isocyanate groups of the prepolymer with water or water vapor in the forced air.

Figure 2:
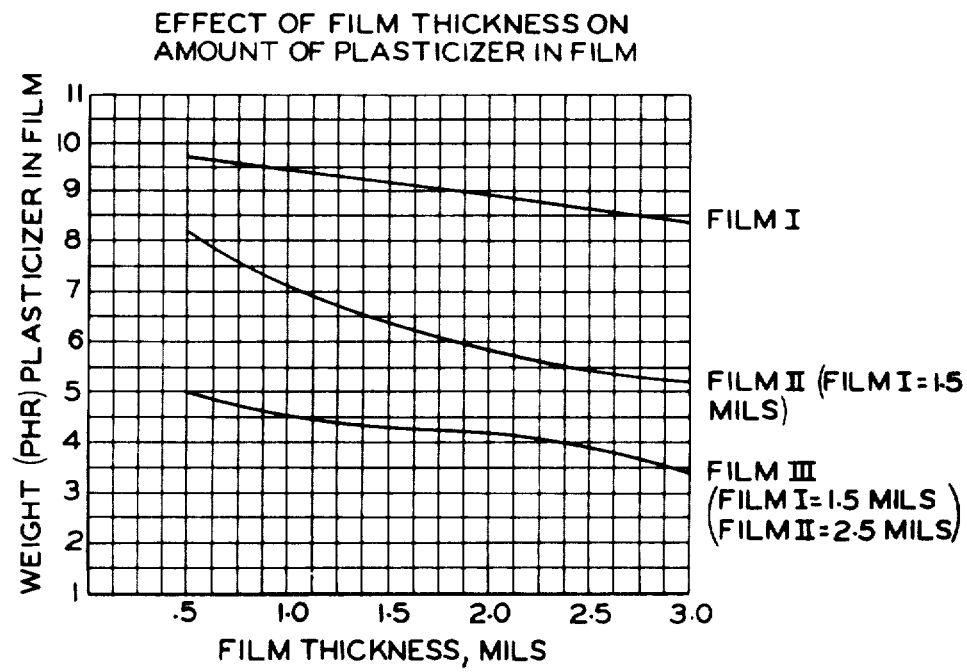

As disclosed above, the first film should be from about 1.0 to 2.0 mils in thickness. At thicknesses of less than 1.0 mils, the migration of plasticizer into and through the film is extremely rapid (FIG. 2). Because of the importance of the thickness of the second film and because total film thickness can be an economic consideration, it is advantageous to keep the thickness of the first film no greater than 2.0 mils. The relationship between the first and second coating thicknesses is clearly demonstrated in FIG. 1 where the rates of plasticizer migration through the cured films is shown as a function of film thickness. As seen from this Figure, the thickness of the second dried film should not be less than 2.0 mils. As indicated in FIG. 1, migration of plasticizer from the first film proceeds more rapidly into the second film when said such is less than 2.0 mils. While any thickness up to 3.0 mils can be used, film thicknesses in excess of 3.0 mils are not preferred. The water (or water vapor) extending and cross linking the prepolymeric material containing isocyanate functionality causes some amount of carbon dioxide to form as a result of by-products from the cross-linking and chain-extension reactions. Vaporized solvent is also diffusing from the film at this time. These gases diffuse readily from films of less than 3.0 mils. However, at film thicknesses greater than this, these gases are trapped as small bubbles and, as such, films containing them suffer severe disadvantages in appearance and physical properties (wearing, staining, and the like). The final film, film 3, as applied to the second dried film is preferably not more than 3.0 mils. In cases where the final product is to be seam sealed by a solvent-based solution, it is preferable to maintain a total film thickness of at least 6.0 mils so as to prevent the seam sealer solution from causing delamination between the polyurethane film and the plasticized polyvinyl chloride substrate. It has been found that a film formed by an aforementioned three wet coat technique and possessing a minimum thickness of 6.0 mils will resist delamination. This polyvinyl chloride substrate is coated with the polyurethane coatings by various well-known techniques. For example, the coatings can be applied by any suitable coating technique such as spraying, forward roll coating, reverse roll coating, and curtain /coating. The coatings are applied and dried and cured in consecutive fashion, as disclosed above in three separate coating, drying, and curing steps. The final composite structure represents a polyurethane coated, plasticized polyvinyl chloride substrate which is stain resistant.

Plasticizer is incorporated in the vinyl chloride composition in an amount generally between about 20 to 60 parts by weight per 100 parts of the vinyl chloride resin. Preferably, the amount of plasticizer is between about 30 to 50 parts per 100 parts of the resin binder. The optimum amount of plasticizer in any given vinyl composition depends largely on the prospective use of final structure formed. The plasticizers which may be employed in the composition are those generally suitable for use in vinyl flooring compositions. Such plasticizers include the ester type plasticizers and the epoxidized drying oils. The more preferred esters are the monomeric esters of acids such as phosphoric, phthalic, adipic, sebacic, etc. Suitable alcohols for forming the monomeric esters having generally about 4 to 16 carbon atoms, more usually 4 to 12 carbon atoms. Examples of such plasticizers include tricresyl phosphate, dioctyl phthalate, 2-ethylhexyl phthalate, diisodecyl phthalate, butylcyclohexyl phthalate, dicyclohexyl phthalate, dicapryl phthalate, dioctyl adipate, and dibutyl sebacate. Epoxidized soya beans oil is a preferred example of an expoxidized drying oil which may be used in formulation of the tile compositions.

The preparation of the plasticized polyvinyl chloride substrate is accomplished by decorating a sintered polyvinyl chloride dry blend sheet with plastisol inks using screeen printing techniques, followed by fusion and facing with a smooth roll. The polyvinyl chloride substrate useful in accordance with the present invention contains the following ingredients within the stated ranges:

| Plasticized Polyvinyl Chloride Dryblend | |
| --- | --- |
| Ingredients | Parts by Weight |
| Polyvinyl chloride homopolymer dryblend resin (Mw= 83,900) | 100 |
| 2-ethylhexyl phthalate plasticizer | 30–50 |
| Stabilizer (Argus Mark Q-275) | 1.5–5.0 |
| Plastisol Printing Ink | |
| Ingredients | Parts by Weight |
| Polyvinyl Chloride Dispersion Grade Resin (Mw = 105,000) | 60–100 |
| Polyvinyl Chloride Blending Grade Resin (Mw = 80,000) | 0–40 |
| 2-ethylhexyl phthalate plasticizer | 20–40 |
| Texanol isobutyrate | 15–30 |
| Stabilizer (Argus Mark Q-275) | 1.5–5.0 |
| Pigment (carbon black) | 1.0–10.0 |

The particular polyvinyl chloride composition is, however, not critical in the method of this invention as long as such is one that has incorporated a plasticizer capable of migration into the polyurethane coatings.

The preferred procedure of producing the polyvinyl chloride substrate is illustrated as follows:

1. The 20 to 60 mils of a powdered plasticized polyvinyl chloride dryblend is metered onto a suitable carrier (such as an asbestos felt) and sintered to a temperature of 130°–160° C.

2. Plastisol printing inks are applied by a screen printer to provide both decoration and filling of the dryblend substrate.

3. The printed dryblend sheet is fused to a temperature of 170°–205° C.

4. The resulting fused sheet is planished immediately after fusion with a smooth steel roll to impart a smooth surface suitable for coating.

The measurement of plasticizer migration from the plasticized polyvinyl chloride substrated into the polyurethane films is accomplished by measuring the amount of plasticizer present in the very top layer of the polyurethane film. Infrared analysis, using attenuated total reflectance (ATR) techniques measures the phthalate ester content in these poylurethane coatings. The ATR method determines the amount of ester present in the first ¼ to ½ mil depth of film. Initial determinations were performed on polyurethane films with known phthalate ester content to obtain calibration data. In this fashion, the spectrum of test samples is compared with calibration data to obtain the amount of phthalate ester present in parts per hundred (phr) in the polyurethane film.

The coating composition employed in the method of this invention is illustrated in the formation formed from the following ingredients:

| | | |
| --- | --- | --- |
| 1. | Polyoxypropylene triol, eq. wt. = 239 | 567 grams |
| 2. | Polyoxypropylene triol, eq. wt. = 506 | 164 grams |
| 3. | Solvent (xylene) | 1926 grams |
| 4. | 4,4'-methylene biscyclohexyl isocyanate | 609 grams |
| 5. | Dibutyltin bis lauryl mercaptide | 1.34 grams |

Coating compositions used in the method of the present invention were prepared by charging the first four ingredients into a 4-liter reaction vessel fitted with a mechanical stirrer, gas inlet, thermometer and Dean Stark trap. The reaction mass, under a stream of nitrogen, was heated to distill approximately ½ of the solvent and the resulting solution cooled to about 60° C., at which time the remaining ingredients were added. The prepolymer formed from this reaction had 45% solids, 2.59% NCO and Brookfield viscosity of 310 cps. The prepolymer solution was used with about 1% (based on solids) additional dibutyltin bis lauryl mercaptide for coating the plasticized polyvinyl chloride substrate.

EXAMPLE 2

The polyurethane prepolymer composition formed from the above formulation was applied to a plasticized polyvinyl chloride substrate formed from 100 parts of polyvinyl chloride resin (Mw 83,900), 40 phr 2-ethylhexyl phthalate and 1.5 phr stabilizer (Argus Mark Q-275) as indicated above. The above coating composition was applied to the fused and planished sheet by a certain coater at various thicknesses. Application of each of the three coatings was followed by forced air drying at 165° C. for 5 minutes before any further coatings or any tests were performed on the cured coating. The results are set forth in FIGS. 1 and 2 in terms of amount of plasticizer migrating into the prepared and cured coatings. These figures demonstrate the application of multiple film of polyurethane over plasticized vinyl substrates effectively inhibit migration (diffusion) of the plasticizer into the top film of a three layered structure.

What is claimed is:

1. A method of inhibiting plasticizer migration from a plasticized polyvinyl chloride substrate comprising the steps of:

1. applying to the surface of said substrate a coating of a solution consisting essentially of an inert organic solvent and an isocyanate-terminated polyurethane, said coating having a viscosity of from 50 to 200 centipoise;

2. removing said inert organic solvent from the applied solution wherein a first substantially homogeneous film of thermosettable polyurethane is formed of from 1.0 to 2.0 mils in thickness;

3. applying to the substantially homogeneous film surface of Step 2 said coating solution of Step 1;

4. removing said inert organic solvent from the applied solution of Step 3 wherein a second substantially homogeneous film of a thermosettable polyurethane is formed of from 2.0 to 3.0 mils in thickness; and 5. repeating Steps 1 and 2 wherein said coating solution is applied to the surface of the second substantially homogeneous film of Step 4; thereby forming a third substantially homogeneous film, of from about 1.5 to 3.0 mils in thickness, whereby plasticizer migration from the polyvinyl chloride substrate to the third substantially homogeneous film is inhibited.

2. The method of claim 1 wherein said polyvinyl chloride substrate has 20 to 60 parts by weight of plasticizer per hundred parts of vinyl chloride resin.

3. The method of claim 1 wherein said isocyanate-terminated polyurethane has a free isocyanate content of from about 4% to about 13% and is formed by the reaction of an aliphatic polyol of average molecular weight 300–1,000 with an aliphatic or cycloaliphatic diisocyanate.

4. The method of claim 1 wherein said organic solvent is removed from said applied solution by forced air conditions at 120° C. to 175° C.

5. A plasticized polyvinyl chloride substrate coated with multiple polyurethane films by the method of claim 1.

* * * * *